United States Patent [19]
Klearman et al.

[11] Patent Number: 5,584,084
[45] Date of Patent: Dec. 17, 1996

[54] BED SYSTEM HAVING PROGRAMMABLE AIR PUMP WITH ELECTRICALLY INTERLOCKING CONNECTORS

[75] Inventors: Jeffrey D. Klearman; Robert Bronson, both of St. Louis; Jerry Roth, House Springs, all of Mo.

[73] Assignee: Lake Medical Products, Inc., St. Louis, Mo.

[21] Appl. No.: 338,681

[22] Filed: Nov. 14, 1994

[51] Int. Cl.⁶ .................................................. A47C 27/08
[52] U.S. Cl. ...................... 5/714; 5/423; 403/2; 403/349
[58] Field of Search ................................. 5/423, 449, 453, 5/455, 456, 461, 467, 468, 469; 403/2, 349, 27; 285/3, 93, 396, 402

[56] References Cited

U.S. PATENT DOCUMENTS

| | | |
|---|---|---|
| 1,154,776 | 9/1915 | Joseph . |
| 3,428,974 | 2/1969 | Stuart . |
| 3,733,697 | 5/1973 | Wickham et al. ........................ 29/628 |
| 3,780,388 | 12/1973 | Thomas et al. . |
| 3,790,975 | 2/1974 | Philipp et al. . |
| 4,168,564 | 9/1979 | Graborez ..................... 15/377 |
| 4,473,923 | 10/1984 | Neroin et al. ............... 15/377 |
| 4,644,597 | 2/1987 | Walker . |
| 4,648,635 | 3/1987 | Jühling ..................... 285/402 |
| 4,768,249 | 9/1988 | Goodwin . |
| 4,779,608 | 10/1988 | Smith ...................... 126/127 |
| 4,864,671 | 9/1989 | Evans ........................... 5/469 |
| 5,016,304 | 5/1991 | Ryhiner . |
| 5,031,260 | 7/1991 | LaBianco . |
| 5,062,167 | 11/1991 | Thomas et al. ............... 5/453 |
| 5,145,213 | 9/1992 | Marrison et al. ............. 285/3 |
| 5,168,589 | 12/1992 | Stroh et al. . |
| 5,182,826 | 2/1993 | Thomas et al. ............... 5/453 |
| 5,216,768 | 6/1993 | Bodine et al. . |
| 5,249,318 | 10/1993 | Loadsman . |
| 5,305,483 | 4/1994 | Watkins . |

FOREIGN PATENT DOCUMENTS 1545806  5/1979  United Kingdom .

*Primary Examiner*—Lloyd A. Gall
*Assistant Examiner*—Fredrick Conley
*Attorney, Agent, or Firm*—Howell & Haferkamp, LC

[57] ABSTRACT

A bed system is provided which limits the inflation time of each of a plurality of ventilating air mattresses with the system to a predetermined time. Each mattress includes a fitting with a spring biased pin for actuating a pump switch when the mattress fitting is properly mated with a pump adapter thereby facilitating inflation of said mattress. The pump is programmed to deactivate at the predetermined time, and to remain deactive until the pump switch is reset. The pin is positioned and constructed to be mechanically rendered inoperable in the process of resetting the switch thereby preventing each mattress fitting from actuating the pump switch a second time.

27 Claims, 4 Drawing Sheets

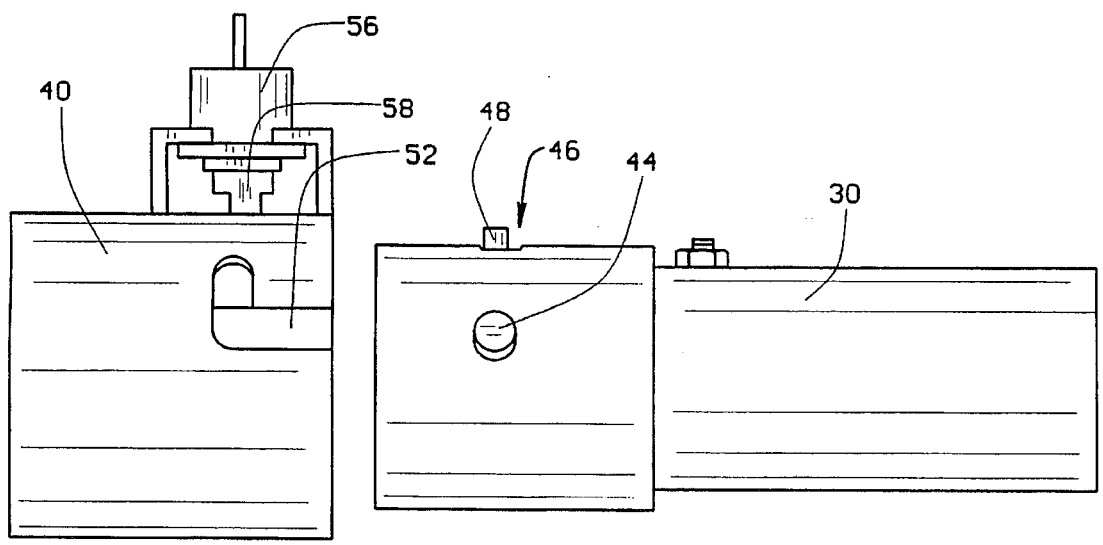
FIG. 2
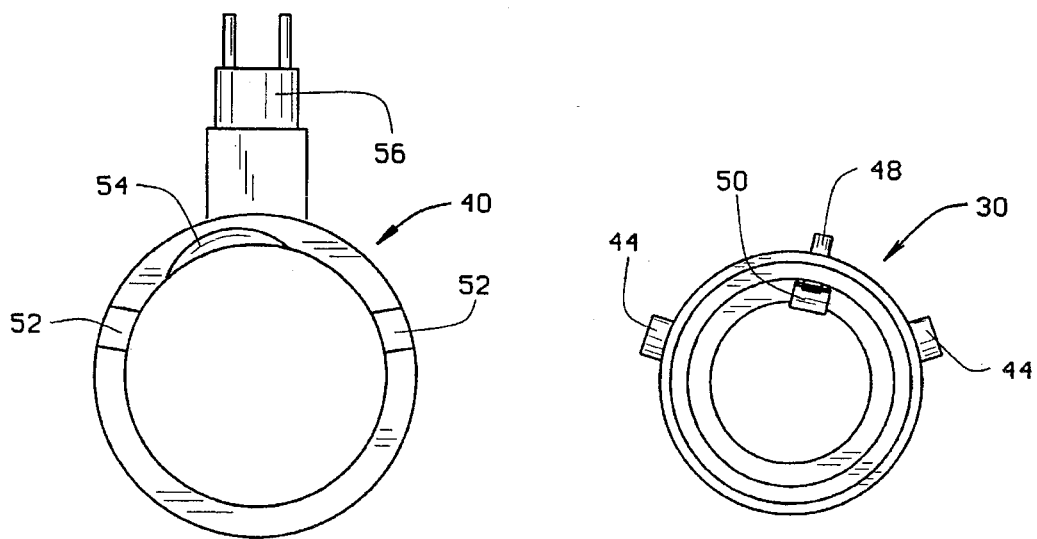
FIG. 3
FIG. 4

5,584,084

BED SYSTEM HAVING PROGRAMMABLE AIR PUMP WITH ELECTRICALLY INTERLOCKING CONNECTORS

BACKGROUND AND SUMMARY OF THE INVENTION

Ventilating air mattresses have been developed and are used in the medical field to minimize bed sores and blisters experienced by people confined to bed for extended lengths of time. These mattresses are inflated with pressurized air from a pump connected through an aperture and have a plurality of pores through their top surface allowing a controlled flow of air therethrough. The ventilating air mattresses distribute the support of a patient over a greater area of the patient's body (when compared to conventional mattresses) thereby relieving pressure in areas of bone protuberances which are highly susceptible to bed sores. The controlled air flow also assists in drying moisture which aggravates the bed sore problem.

Due in part to the success of these ventilating air mattresses in minimizing bed sores, health-care facilities with one or more of these mattresses keep them in near constant use. Once a patient assigned to a ventilating air mattress departs a hospital or other health-care facility, the ventilating air mattress is quickly sterilized and used with another patient. Several problems have arisen from the propensity to continuously use these mattresses. First, to withstand the magnitude of use to which these mattresses are typically subjected requires highly durable materials. This is particularly true for the top porous sheet, the seams, and the pump/mattress connection. A typical prior art ventilating air mattress is constructed of 200 denier nylon and is specially sealed to assure reliability. The expense of these materials and the associated construction costs inflate the unit cost of each bed.

Moreover, and perhaps more importantly, the continuous use of the prior art mattresses with multiple patients leads to a risk of cross-contamination. Body fluids routinely soil the mattress covers and other bedding materials and, with extended use, the mattresses themselves may absorb contaminants and become soiled or stained by undesirable residue. Because it is difficult and time consuming, and therefore expensive to properly sterilize these mattresses, a tight financial climate may tempt hospital/health-care personnel to cut costs and save time by cleaning and not sterilizing these mattresses between uses. This practice significantly increases the risk of cross-contamination. A related problem is the accumulation of fluids, residue, and other contaminants within the mattress pores which may eventually clog these air passages. This again poses a cross-contamination concern and hinders the primary functions of the ventilating air mattress—relieving pressure in areas of bone protuberances and assisting in drying moisture which often aggravates the bed sore problem.

In order to solve these and other problems in the prior art, the inventors herein have succeeded in designing and developing a ventilating air mattress bed system which includes a two piece single use connector with electrical interlock for connection of a ventilating air mattress to a programmable air pump. The programmable air pump is electrically connected to the electrical interlock which is actuated upon connection of the ventilating air mattress to thereby enable the programmable air pump. The programmable air pump then inflates the air mattress for a predetermined time period or a predetermined duty cycle. At the end of that predetermined time period or duty cycle, the pump is programmed to turn itself off and will not recycle for another operation until the interlock is reset. As the connector between the ventilating air mattress and pump is a single use connector, and is designed to become mechanically inoperable upon disconnection, the same ventilating air mattress may not be simply disconnected and reconnected for a second duty cycle. Instead, once the ventilating air mattress connection is disconnected, it is no longer capable of reactivating the electrical interlock and a new ventilating air mattress with an unused connector must be reconnected.

The single use connector with electrical interlock is designed as a two-piece connector with the electrical switch portion being permanently mounted on the programmable pump and the inexpensive mechanical actuator portion being mounted on each ventilating air mattress. This mechanical actuator portion on the ventilating air mattress piece is mechanically damaged upon disconnection so as to render it inoperable, but the electrical switch portion on the programmable pump remains intact. Consequently, the replaceable ventilating air mattress and connector portion are relatively inexpensive, mechanical pieces, which facilitate their ready replacement.

Thus, the present invention is a significant improvement over the prior art by providing a system which limits the risk of cross-contamination associated with the continuous use of a single mattress in the prior art. Moreover, the materials and manufacturing costs necessary for this limited use mattress are small in comparison to the prior art ventilating air mattresses, and, due to its elegantly simple design and construction, the single use connector and programmable pump of this invention are easily used without significant training. While the principal advantages and features of the present invention are briefly described above, a more thorough understanding and appreciation for the advantages and features of the invention may be obtained by referring to the drawings and descriptions of the preferred embodiments which follow.

BRIEF DESCRIPTION OF THE DRAWINGS

FIG. 2 is a side elevation view of the mattress fitting and the pump adapter, for illustrative purposes the adapter is shown without the pump housing in FIGS. 2, 3, and 5–9;

FIG. 3 is a front view of the pump adapter;

FIG. 4 is a front view of the mattress fitting;

DETAILED DESCRIPTION OF THE PREFERRED EMBODIMENT

Figure 1:
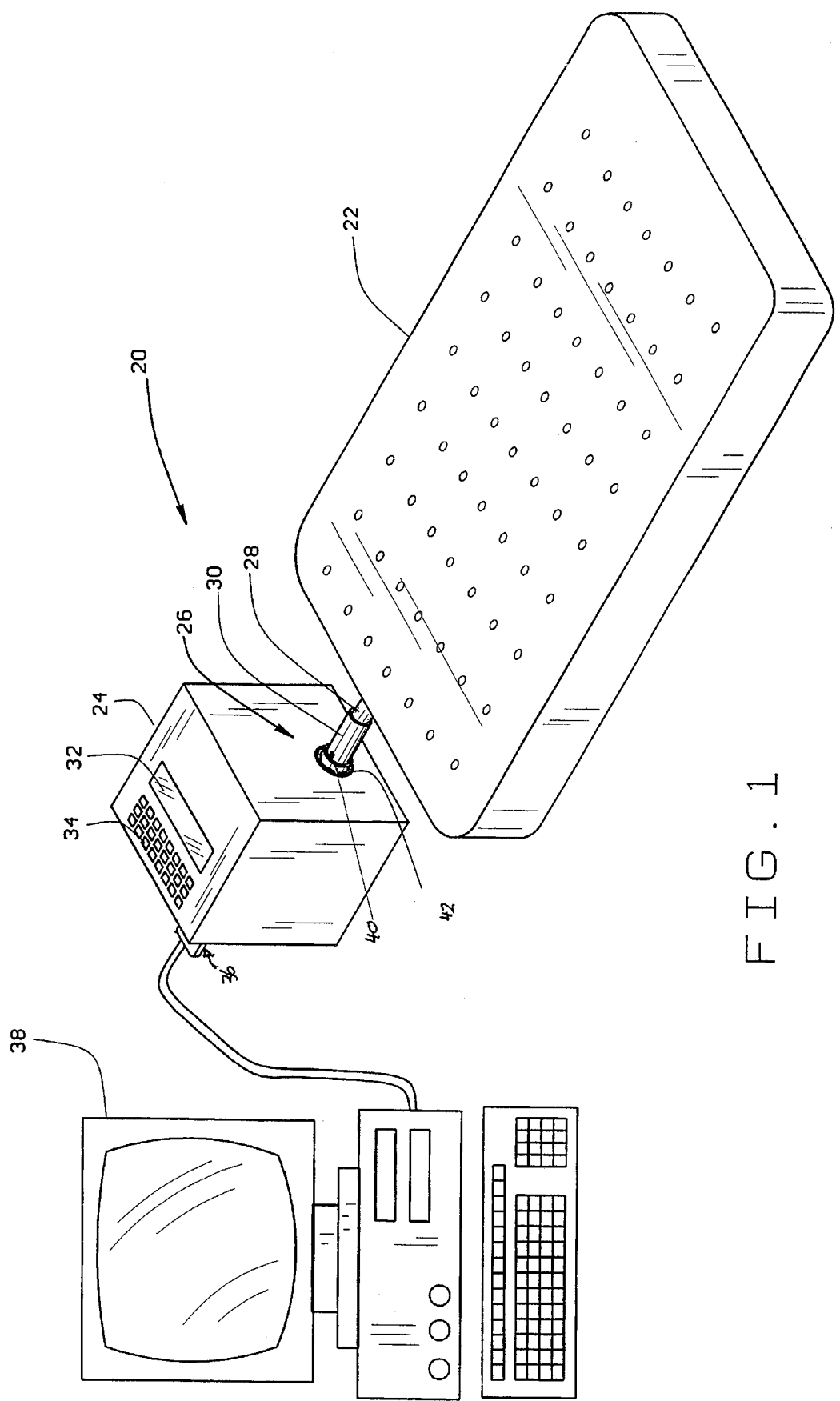
FIG. 1 is an isometric view of a bed system of the present invention showing a ventilating air mattress and corresponding mattress fitting, an air pump with an adapter housed therein, and an optional remote computer connection.

A bed system constructed according to the principles of the present invention, which limits the operability of an air mattress with the bed system, is illustrated generally as 20 in FIG. 1. The system 20 includes a plurality of substantial identical ventilating air mattresses 22 (only one is shown), a programmable air pump 24, and a single use connector 26 between the pump 24 and one of the mattresses 22. The ventilating air mattress 22 has a tube 28 extending therefrom and a fitting 30 at the end of the tube. The programmable pump 24 preferably includes a Windjammer blower manufactured by Ametek, a display 32, a keyboard 34 or other data entry means, a communication jack 36 for linking the pump 24 with a remote input/output terminal 38, and an adapter 40 within the pump housing extending through to an aperture 42 therein.

The single use connector 26 includes the mattress fitting 30 and the pump adapter 40 (See FIG. 2). The fitting 30 is preferably tubular with two pegs 44 extending radially therefrom and an aperture 46 extending through the fitting 30. A pin 48 extends through the aperture 46 and is connected near the end of a spring latch 50. The spring latch 50 biases the pin 48 in a first position such that part of the pin extends beyond the exterior circumference of the fitting 30 (See FIGS. 2 and 4). In the preferred embodiment, the spring latch 50 is sufficiently compliant to allow the pin 48 to retract flush with the fitting exterior circumference upon application of a moderate force, and sufficiently resilient to return the pin 48 to the first position upon removal of the force.

Figure 5:
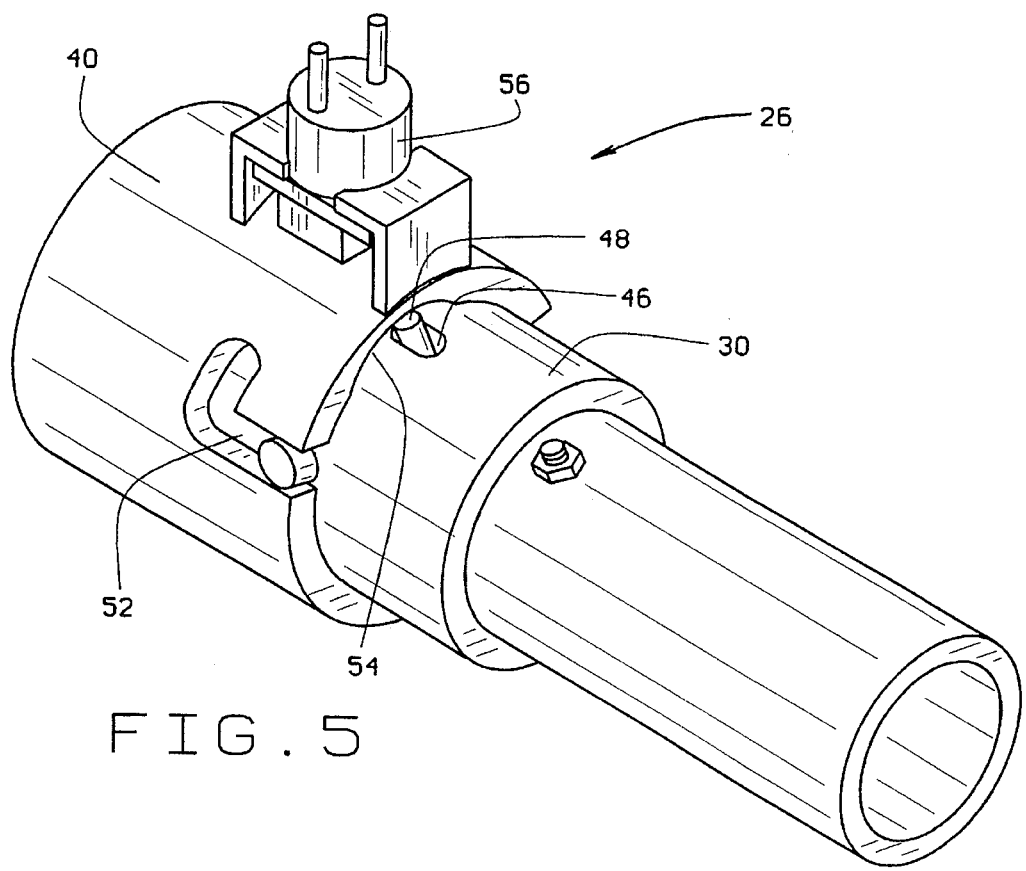
FIG. 5 is an isometric view of the connector showing the spring biased pin of the fitting aligned with the adapter ramp.
Figure 6:
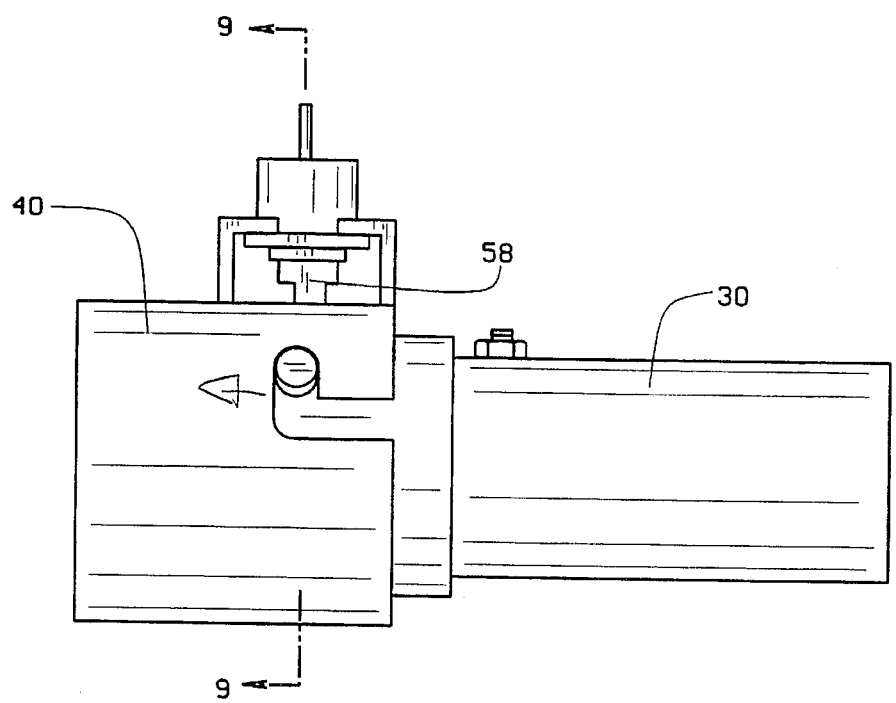
FIG. 6 is a side elevation view of the connector showing the fitting and adapter properly mated with the fitting pegs inserted to the ends of the adapter J-shaped slots.
Figure 7:
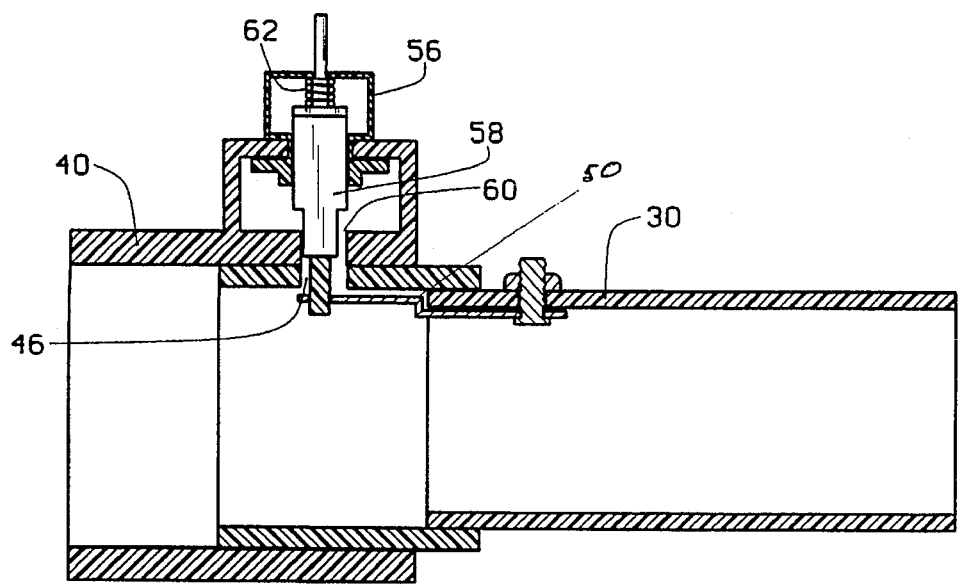
FIG. 7 is a cross-sectional view of the connector of the present invention further illustrating the relationship between the spring biased pin and the switch when the fitting and adapter are properly mated.

The adapter 40 is preferably tubular with an interior circumference slightly larger than the exterior circumference of the mattress fitting 30 such that the fitting 30 and adapter 40 are in sliding engagement when the fitting is inserted into the adapter. Two J-shaped slots 52 and a ramped surface 54 are located at the front end of the adapter 46. (See FIGS. 3 and 5) An electrical interlock switch 56 is mounted to the adapter 40 and is electrically connected to the blower of pump 24. The switch 56 includes an arm 58 which extends into an adapter aperture 60 and is biased by a spring 62 such that the arm 58 is approximately flush with the interior circumference of the adapter 40. Preferably, the spring 62 is sufficiently compliant to allow the arm 58 to be pushed into the switch with the force generated by the spring latch 50, thereby actuating the switch. (See FIG. 9)

In operation, one of the plurality of ventilating air mattresses 22 is selected and the corresponding fitting 30 is positioned relative to the pump adapter 40 such that the fitting pegs 44 and pin 48 align with the adapter J-shape slots 52 and ramp 54, respectively. (See FIG. 5) In the preferred embodiment, the two pegs 44, and the corresponding J-shaped slots 52, are positioned at other than 180° (See FIGS. 3 and 4) thereby defining a single proper alignment between the fitting 30 and the adapter 40. As the fitting 30 is pushed into the adapter 40, the pin 48 slides up the ramp 54 which retracts it from its first position to a position flush with the interior circumference of the adapter 40. The fitting aperture 46 and adapter aperture 60 are positioned to align with one another when the fitting 30 is pushed into the adapter 40 and twisted thereby locating the pegs 44 at the ends of the J-shaped slots 52. When the apertures 46 and 60 align, the spring latch 50 returns the pin 48 to its first position thereby pushing the pin into the adapter aperture 60 and engaging the switch arm 58. In the preferred embodiment, the spring latch 50 is sufficiently resilient and the switch spring 62 is sufficiently compliant such that the pin 48 pushes the arm 58 into the switch 56 thereby actuating the switch.

The pump 24 is programmed via the keyboard 34 or the remote input/output terminal 38, to operate for a predetermined length of time and then deactivate until the adapter switch 56 is reset. As used herein "predetermined time" shall refer to a set number of total hours of pump activation (i.e. 15, 30, 90 hours of operation), a set number of chronological hours (i.e. 30, 90, 180 hours from the moment the pump is activated with a given mattress), a set time and date in the future (i.e. first Monday of each month at 8:00 a.m.), and/or a set number of times the pump is manually turned off (i.e. the pump deactivates upon being manually turned off three times thereby controlling the number of times a given mattress is reused). Other predetermined times may be selected and are limited only by the program capability of pump 24. However, predetermined time as used herein is not intended to encompass a time frame equal to or greater than the useful life of a typical ventilating air mattress as measured by material failure due to normal wear and tear. When the timing command is properly entered into the pump 24 and the switch 56 is actuated, the pump 24 commences operation thereby inflating the ventilating air mattress 22. In the preferred embodiment, a message is produced on the display 32 or the input/output terminal 38, to alert hospital personnel approximately eight hours prior to the programmed pump deactivation time. At the predetermined time, the pump deactivates thereby causing the ventilating air mattress 22 to deflate and prohibiting reactivation until the switch 56 is reset. Resetting the switch 56 requires the arm 58 to be released to its original position and then pushed back into the switch 56.

Figures 8, 9:
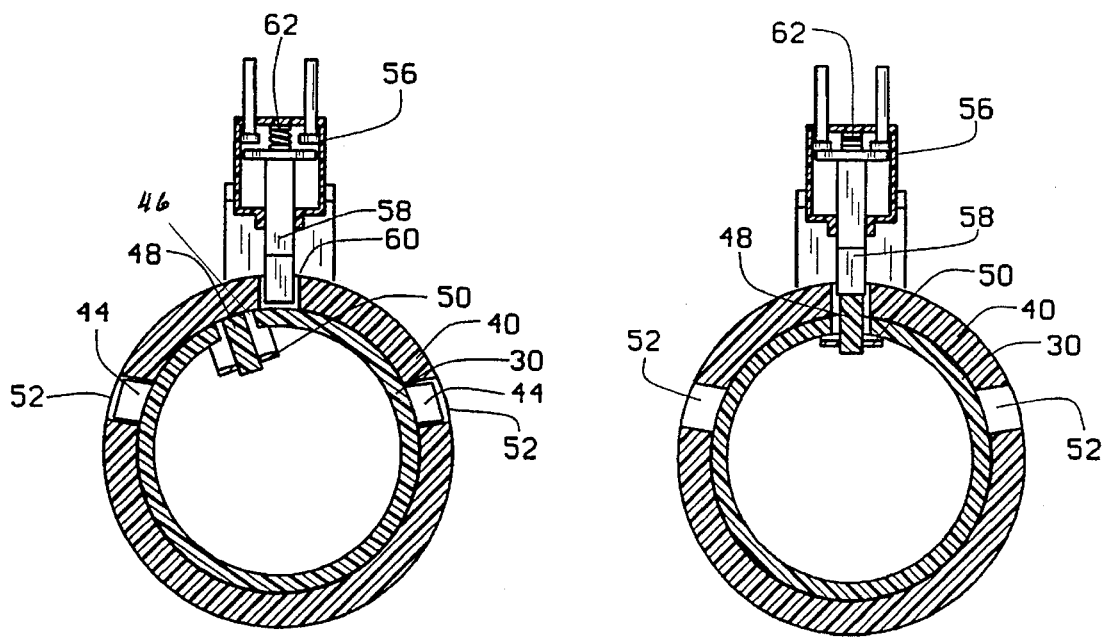
FIG. 8 is a cross-sectional view of the connector illustrating the relationship between the mattress fitting pin and the pump switch when the fitting pegs are only advanced to the turn in the adapter J-shaped slots.
FIG. 9 is a cross-sectional view taken along lines 9—9 in FIG. 6 illustrating the relationship between the mattress fitting pin and the pump switch when the fitting pegs are fully advanced to the ends of the adapter J-shaped slots.

In the preferred embodiment, because the adapter is located within the pump housing and the spring latch 50 is mounted on the interior of the mattress fitting 30, the pin 48 and switch arm 58 are not easily accessible when the fitting and adapter are properly mated. Thus, returning the arm 58 to its original position (in order to reset the switch) requires removing the pin 48 from the adapter aperture 60 by misaligning the fitting aperture 46 and the adapter aperture 60. As illustrated in FIG. 9, the pin 48 is positioned well into the adapter aperture 60 when the fitting and adapter are properly mated. As the mattress fitting 30 is rotated with respect to the pump adapter 40 to mechanically separate them, the pin 48/spring 50 are mechanically interfering to thereby be damaged and rendered inoperable. This can happen in one of several ways, depending upon the particular design chosen. For example, pin 48 may be designed and constructed of such materials such that it is sheared. Alternately, the spring 50 connection to the mattress fitting 30 may break away to permit pin 48 and spring 50 to remain intact but drop out of aperture 60 and thereby permit continued relative rotation between mattress fitting 30 and adapter 40. In still another alternative design, pin 48 may itself break away from spring 50. Any one of these alternatives is considered to be adequate to render the mattress fitting 30 inoperable for subsequent reconnection and reuse of the same ventilating air mattress. Because the fittings 30 are not easily interchangeable, the present invention assures that the first ventilating air mattress 22 is not utilized by the system beyond the predetermined time period programmed in the pump 24.

In the preferred embodiment, the pump 24 includes a lithium battery to provide non-volatile memory of the pump logic stage even in the event of a power outage or an operator attempting to circumvent the pump logic by unplugging the system. Moreover, the communication jack 36 and remote input/output terminal 38 allow the system 20 to be controlled at a central station or off site if desired.

In its use, the bed system of the present invention is elegantly simple and provides significant advantages over the prior art. The method of using the bed system is also novel and unique and includes the steps of selecting a first of the ventilating air mattress 22 and properly mating the mattress fitting 30 with the pump adapter 40 thereby facilitating inflation of the mattress, and automatically disabling the first mattress for use with the bed system upon a predetermined time. As used herein, "disable" shall mean prohibiting the mattress from operating as a ventilating air mattress with the bed system 20 and includes: (1) facilitating deflation of the mattress if the mattress is inflated; and (2) inhibiting reinflation of the mattress by the system. The air pump 24 is programmed to deactivate after the predetermined time and will not reactivate until the adapter switch 56 is reset. The step of resetting the switch 56 damages the mechanical actuator comprised of pin 48 and spring 50 associated with the first mattress fitting 30 rendering the mattress fitting nonfunctional to actuate the switch 56 a second time. Because the fittings 30 and mattresses 22 are not easily interchangeable or repairable, this procedure effectively disables each mattress after the predetermined time.

While the preferred embodiment describes a bed system 20 incorporating a full-length ventilating air mattress 22, it is understood that the mattress may comprise a number of modular sections without departing from the scope of this invention. Moreover, there are various other changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A programmable air mattress system comprising:
   an air mattress;
   a programmable air pump;
   a first connector operatively attached to the pump and having a fluid passageway therein in fluid communication with the pump;
   a second connector attached to the air mattress and having a fluid passageway therein in fluid communication with an interior of the mattress, said second connector being configured for connection to said first connector;
   said second connector including a facilitating portion which in cooperation with the air pump and first connector facilitates inflation of the air mattress by the pump when said first and second connectors are connected together for the first time;
   said first connector including a disabling portion configured for engaging said facilitating portion during disconnection of the second connector from the first connector;
   said first and second connectors being configured such that engagement of the facilitating portion by the disabling portion during disconnection of the second connector from the first connector renders the facilitating portion inoperable so that said air mattress is capable of operable connection to said air pump for only a single use.

2. The programmable air mattress system of claim 1 wherein said facilitating portion comprises a mechanical actuator and wherein said mechanical actuator is physically rendered inoperable upon separation of said first and second connectors to thereby prevent operable re-connection of said first and second connectors.

3. The programmable air mattress system of claim 2 wherein said first connector further comprises an electrical switch electrically connected to said pump, and said mechanical actuator being configured for actuating said electrical switch upon connection of said first and second connectors.

4. The programmable air mattress system of claim 1 further comprising a mechanical interlock to securely fasten said second connector to said first connector.

5. The programmable air mattress system of claim 4 wherein said mechanical interlock comprises a bayonet fastener.

6. The programmable air mattress system of claim 3 wherein each of said first and second connectors includes an aperture, the aperture of said first connector aligning with the aperture of said second connector when the first and second connectors are connected together.

7. The programmable air mattress system of claim 6 wherein said mechanical actuator includes a spring loaded pin extending through the aperture of said second connector.

8. The programmable air mattress system of claim 7 wherein said first connector includes a ramp for depressing said spring loaded pin as said second connector is connected to said first connector.

9. The programmable air mattress system of claim 8 wherein said electrical switch is aligned with the aperture of said first connector so that as said apertures become aligned by connecting said second connector to said first connector, said spring loaded pin extends through said aligned apertures to actuate said electrical switch.

10. The programmable air mattress system of claim 9 wherein said disabling portion defines the aperture of said first connector, said pin being configured to extend sufficiently into the aperture of said first connector when said first and second connectors are connected together to thereby mechanically interfere with disconnection of said single use connector.

11. A ventilating air mattress for use in a bed system, said bed system comprising an air pump and a first connector operatively attached to the pump and having a fluid passageway therein in fluid communication with the pump, said air mattress comprising:
   an inflatable mattress body;
   a single use connector attached to the mattress body and having a fluid passageway therein in fluid communication with an interior of the mattress, said single use connector being configured for connection to said first connector of the bed system, said single use connector including a facilitating portion which in cooperation with the air pump and first connector facilitates inflation of the mattress body by the pump when said single use connector is connected to the first connector, said facilitating portion being configured for engaging a disabling portion of the first connector, said single use connector being configured such that engagement of the facilitating portion by the disabling portion during disconnection of the single use connector from the first connector renders the facilitating portion inoperable so that said air mattress is capable of operable connection to said bed system for only a single use.

12. The ventilating air mattress of claim 11 wherein said facilitating portion includes a mechanical actuator and wherein disconnection of said single use connector from the first connector of said bed system physically renders said mechanical actuator inoperable.

13. The ventilating air mattress of claim 11 wherein said single use connector further comprises a mechanical interlock to securely fasten said single use connector to said first connector of said bed system.

14. The ventilating air mattress of claim 11 wherein said single use connector is securely fastened to said first connector by a bayonet fastener.

15. The ventilating air mattress of claim 12 wherein said mechanical actuator includes a spring loaded pin extending through an aperture in said single use connector.

16. A method of limiting the inflation of an air mattress within a bed system to a predetermined time, the method comprising the steps of:

connecting said mattress to an air pump;

inflating said mattress with the air pump;

deactivating said pump at the predetermined time; and inhibiting reactivation of the pump until after disconnection of the mattress from the air pump.

17. The method according to claim 16 further comprising the steps of deflating said mattress and of disabling the mattress so that the mattress cannot be re-inflated by the pump after said predetermined time.

18. The method according to claim 16 wherein the pump includes a switch moveable between a first position to enable activation of the pump and a second position to disable activation of the pump, the step of connecting the mattress to the pump causing the switch to be moved to its first position.

19. The method according to claim 18 wherein the mattress includes a frangible switch actuator which forces the switch to its first position when the mattress is connected to the pump, the method further comprising the step of breaking the switch actuator to prevent it from moving the switch from the second position to the first position.

20. The method according to claim 18 further comprising the step of moving the switch to its second position by disconnecting the mattress from the pump.

21. The method according to claim 20 further comprising the subsequent step of moving the switch to its first position by connecting another air mattress to the pump.

22. The method according to claim 16 wherein the step of inhibiting reactivation of the pump further comprises inhibiting reactivation of the pump until after another mattress is connected to the pump.

23. A method of operating a bed system having an air pump and a first connector in fluid communication with the air pump, the method comprising the steps of:

providing a first air mattress assembly having an air mattress and a mattress connector attached to the air mattress, said mattress connector having a fluid passageway therein in fluid communication with an interior of the air mattress;

connecting the mattress connector of the first air mattress assembly to the first connector;

inflating the mattress of the first mattress assembly with the air pump;

disabling the mattress connector of the first mattress assembly so that it cannot be operably reconnected to the connector for reinflation of the mattress by the air pump;

disconnecting the first mattress assembly from the connector; and connecting a second air mattress assembly to the connector.

24. The method according to claim 23 wherein the disabling step and disconnecting step are simultaneously performed.

25. The method according to claim 24 wherein the disabling step is performed the first time the disconnecting step is performed.

26. The method according to claim 23 further comprising the step of maintaining connection of the first mattress assembly to the first connector of the bed system during use of the first mattress assembly by a patient.

27. The method according to claim 23 further comprising the steps of:

deactivating said pump a predetermined time after inflation of the first air mattress; and inhibiting reactivation of the pump until after connection of the second mattress assembly to the first connector of the bed system.

\* \* \* \* \*